United States Patent
Hamada et al.

(10) Patent No.: US 6,188,037 B1
(45) Date of Patent: Feb. 13, 2001

(54) WELDED HIGH-STRENGTH STEEL STRUCTURES AND METHOD OF MANUFACTURING THE SAME

(75) Inventors: Masahiko Hamada, Amagasaki; Yu-ichi Komizo, Nishinomiya; Takeshi Moncho, Takarazuka, all of (JP)

(73) Assignee: Sumitomo Metal Industries, Ltd., Osaka (JP)

(*) Notice: Under 35 U.S.C. 154(b), the term of this patent shall be extended for 0 days.

(21) Appl. No.: 09/040,453

(22) Filed: Mar. 18, 1998

(30) Foreign Application Priority Data

Mar. 26, 1997 (JP) .................................................. 9-072870

(51) Int. Cl.[7] .................................................. B23K 31/02
(52) U.S. Cl. ............................................ 219/61; 219/60 R
(58) Field of Search ..................... 219/61, 60.2, 60 R, 219/59.1, 136, 137 R, 146.1; 148/516, 519

(56) References Cited

U.S. PATENT DOCUMENTS

| | | | | |
|---|---|---|---|---|
| 3,867,608 | * | 2/1975 | Ohwa et al. | 219/73 |
| 3,919,517 | * | 11/1975 | Ishizaki et al. | 219/73 |
| 4,152,148 | * | 5/1979 | Machmeier | 75/124 |
| 4,591,396 | * | 5/1986 | Mazuda et al. | 148/12 F |
| 4,629,504 | * | 12/1986 | Koike et al. | 420/38 |
| 5,591,391 | * | 1/1997 | Igarashi et al. | 420/38 |

FOREIGN PATENT DOCUMENTS

| | | |
|---|---|---|
| 8-104922 | 4/1996 | (JP) . |
| 8-209291 | 8/1996 | (JP) . |

* cited by examiner

Primary Examiner—Patrick Ryan
Assistant Examiner—M. Alexandra Elve
(74) Attorney, Agent, or Firm—Burns, Doane, Swecker & Mathis, LLP (57) ABSTRACT

The present invention is a welded high-strength steel structure having a TS of not less than 900 MPa and excellent low-temperature toughness and a method of manufacturing the steel structure. The base steel is formed of a mixed structure of martensite and lower bainite and has a TS of not less than 900 MPa, and the weld metal is steel which has the following elements based on % by weight: C: 0.01% to 0.15%; Si: 0.02% to 0.6%; Mn: 0.6% to 3%; Al: 0.004% to 0.08%; Ti: 0.003% to 0.03%; O (oxygen): not greater than 0.06%; B: 0.0002% to 0.00%; and as optional components, Cu, Ni, Cr, Mo, V, and Nb and which satisfies the following two equations: $0.25 \leq Pcm \leq 0.32$ and $0.6 \leq Al/O$ (oxygen) $\leq 1.4$.

6 Claims, 9 Drawing Sheets

| Steel | \multicolumn{12}{c|}{Chemical compositions of base steel (mass%: bal. Fe)} | Ceq | Pcm |
|---|---|---|---|---|---|---|---|---|---|---|---|---|---|---|
| | C | Si | Mn | Cu | Ni | Cr | Mo | V | Nb | Ti | B | Al | | |
| 1 | 0.08 | 0.05 | 0.80 | — | 0.50 | 0.75 | 0.61 | — | 0.014 | 0.005 | — | 0.005 | 0.519 | 0.208 |
| 2 | 0.05 | 0.09 | 0.85 | 1.14 | 1.10 | — | 0.57 | — | — | — | 0.0009 | 0.006 | 0.457 | 0.215 |
| 3 | 0.06 | 0.18 | 1.20 | 0.30 | 0.10 | — | 0.40 | 0.057 | 0.043 | — | 0.0010 | 0.005 | 0.375 | 0.177 |
| 4 | 0.04 | 0.15 | 0.78 | 1.17 | 0.73 | 0.52 | 1.00 | — | — | 0.011 | — | 0.005 | 0.604 | 0.250 |
| 5 | 0.12 | 0.09 | 0.60 | — | — | — | 0.57 | 0.057 | — | 0.008 | 0.0011 | 0.011 | 0.349 | 0.205 |
| 6 | 0.14 | 0.17 | 1.45 | — | 0.64 | — | — | — | — | 0.008 | 0.0007 | 0.007 | 0.422 | 0.230 |
| 7 | 0.07 | 0.19 | 1.32 | — | 0.91 | 0.46 | 0.14 | 0.076 | 0.067 | 0.015 | 0.0005 | 0.008 | 0.492 | 0.205 |
| 8 | 0.08 | 0.14 | 0.72 | 0.31 | 0.83 | 0.55 | 0.50 | 0.027 | 0.017 | 0.015 | 0.0006 | 0.009 | 0.489 | 0.214 |
| 9 | 0.08 | 0.14 | 0.71 | 0.33 | 1.63 | 0.52 | 0.46 | 0.029 | 0.020 | 0.011 | 0.0011 | 0.009 | 0.526 | 0.224 |
| 10 | 0.05 | 0.16 | 1.00 | 1.21 | 0.77 | 0.52 | 0.27 | 0.029 | 0.016 | 0.011 | 0.0009 | 0.010 | 0.518 | 0.235 |
| 11 | 0.08 | 0.17 | 1.10 | 0.30 | 1.19 | 0.52 | 0.30 | 0.036 | 0.030 | 0.011 | 0.0005 | 0.011 | 0.532 | 0.226 |
| 12 | 0.09 | 0.17 | 1.45 | — | 0.94 | 0.45 | 0.49 | 0.079 | 0.069 | 0.015 | 0.0005 | 0.015 | 0.600 | 0.252 |
| 13 | 0.08 | 0.17 | 1.47 | 0.31 | 0.33 | 0.65 | 0.29 | 0.039 | 0.039 | 0.015 | 0.0005 | 0.005 | 0.564 | 0.240 |
| 14 | 0.05 | 0.14 | 1.00 | 1.11 | 0.89 | 0.52 | 0.47 | 0.027 | 0.017 | 0.010 | 0.0005 | 0.006 | 0.558 | 0.242 |
| 15 | 0.08 | 0.17 | 0.81 | 1.23 | 0.77 | 0.54 | 0.27 | 0.029 | 0.019 | 0.010 | 0.0011 | 0.010 | 0.517 | 0.255 |
| 16 | 0.09 | 0.14 | 1.25 | 0.60 | 0.74 | 0.35 | 0.47 | 0.054 | 0.047 | 0.007 | — | 0.013 | 0.563 | 0.254 |
| 17 | 0.10 | 0.13 | 1.42 | 0.31 | 1.00 | 0.41 | 0.54 | 0.024 | 0.010 | 0.015 | — | 0.011 | 0.622 | 0.270 |
| 18 | 0.07 | 0.19 | 1.00 | — | 1.40 | 0.29 | 0.40 | — | 0.019 | 0.016 | — | 0.041 | 0.466 | 0.188 |
| 19 | 0.05 | 0.20 | 1.46 | — | 0.90 | 0.45 | 0.17 | 0.034 | 0.034 | 0.001 | — | 0.042 | 0.486 | 0.183 |
| 20 | 0.06 | 0.20 | 1.37 | 0.29 | 0.09 | 0.26 | 0.19 | 0.027 | 0.019 | 0.012 | — | 0.035 | 0.406 | 0.176 |
| 21 | 0.07 | 0.19 | 0.75 | 0.30 | 0.66 | 0.36 | 0.37 | 0.027 | 0.019 | 0.011 | — | 0.039 | 0.409 | 0.182 |
| 28 | 0.07 | 0.21 | 1.66 | 0.29 | 1.07 | 0.32 | 0.43 | 0.041 | 0.043 | 0.010 | 0.0005 | 0.005 | 0.591 | 0.239 |
| 33 | 0.07 | 0.22 | 1.67 | 0.29 | 1.07 | 0.32 | 0.39 | 0.038 | 0.043 | 0.009 | 0.0006 | 0.062 | 0.584 | 0.237 |
| 43 | 0.08 | 0.21 | 1.42 | 0.29 | 1.29 | 0.32 | 0.44 | 0.026 | 0.017 | 0.005 | — | 0.045 | 0.582 | 0.245 |
| 44 | 0.14 | 0.13 | 2.35 | 1.14 | — | — | — | — | — | 0.015 | 0.0015 | 0.021 | 0.604 | 0.322 |
| 22 | 0.07 | 0.20 | 1.43 | 0.30 | 0.04 | 0.26 | — | 0.046 | 0.046 | — | — | 0.026 | 0.392 | 0.180 |
| 23 | 0.06 | 0.19 | 1.48 | 0.29 | 0.34 | 0.29 | 0.23 | 0.033 | 0.026 | 0.005 | — | 0.040 | 0.459 | 0.193 |
| 24 | 0.12 | 0.21 | 1.68 | — | — | 0.89 | — | — | — | 0.015 | — | 0.039 | 0.581 | 0.259 |
| 25 | 0.11 | 0.14 | 1.35 | — | 0.36 | — | 1.30 | — | — | 0.011 | 0.0008 | 0.039 | 0.617 | 0.277 |
| 26 | 0.14 | 0.17 | 2.04 | — | — | — | — | 0.057 | — | 0.005 | 0.0011 | 0.021 | 0.489 | 0.256 |
| 27 | 0.14 | 0.26 | 2.01 | 0.71 | — | — | — | — | 0.057 | — | — | 0.005 | 0.520 | 0.282 |
| 29 | 0.07 | 0.19 | 1.59 | 0.29 | 1.07 | 0.32 | 0.43 | 0.038 | 0.043 | 0.008 | 0.0005 | 0.012 | 0.579 | 0.235 |
| 30 | 0.06 | 0.19 | 1.67 | 0.29 | 1.06 | 0.26 | 0.41 | 0.039 | 0.044 | 0.009 | 0.0006 | 0.021 | 0.570 | 0.228 |
| 31 | 0.07 | 0.02 | 1.65 | 0.29 | 1.07 | 0.27 | 0.43 | 0.040 | 0.044 | 0.011 | 0.0005 | 0.035 | 0.579 | 0.230 |
| 32 | 0.07 | 0.21 | 1.66 | 0.29 | 1.05 | 0.32 | 0.40 | 0.037 | 0.043 | 0.012 | 0.0005 | 0.045 | 0.583 | 0.237 |
| 34 | 0.06 | 0.19 | 1.72 | — | — | 0.46 | 0.30 | 0.036 | 0.027 | 0.011 | — | 0.025 | 0.511 | 0.203 |
| 35 | 0.10 | 0.19 | 1.07 | — | 0.73 | 0.48 | 0.46 | 0.026 | 0.017 | — | 0.0008 | 0.024 | 0.515 | 0.229 |
| 36 | 0.07 | 0.19 | 1.23 | 0.29 | 0.69 | 0.38 | 0.46 | 0.027 | 0.017 | 0.011 | 0.0010 | 0.022 | 0.517 | 0.225 |
| 37 | 0.07 | 0.19 | 1.64 | 0.31 | 0.54 | 0.24 | 0.41 | 0.029 | 0.020 | — | — | 0.025 | 0.535 | 0.224 |
| 38 | 0.07 | 0.21 | 1.61 | 0.30 | 0.34 | 0.28 | 0.47 | 0.027 | 0.019 | — | — | 0.028 | 0.538 | 0.228 |
| 39 | 0.07 | 0.20 | 1.50 | 0.29 | 1.67 | 0.29 | 0.46 | 0.027 | 0.017 | — | — | 0.027 | 0.602 | 0.237 |
| 40 | 0.15 | 0.49 | 2.77 | — | 0.64 | — | — | — | — | — | — | 0.015 | 0.656 | 0.317 |
| 41 | 0.08 | 0.17 | 1.52 | 0.29 | 1.16 | 0.45 | 0.44 | 0.026 | 0.017 | 0.011 | — | 0.020 | 0.616 | 0.253 |
| 42 | 0.08 | 0.20 | 1.52 | 0.29 | 0.86 | 0.45 | 0.44 | 0.026 | 0.017 | 0.007 | — | 0.035 | 0.596 | 0.249 |

Fig. 3

| Wire | Chemical compositions of wire (mass%  :  bal.Fe) ||||||||
|---|---|---|---|---|---|---|---|---|
| | C | Si | Mn | Cu | Ni | Cr | Mo | Ti |
| A | 0.08 | 0.2 | 2.5 | — | 2.5 | — | — | 0.05 |
| B | 0.08 | 0.2 | 2.5 | — | 5.0 | — | 1 | 0.05 |
| C | 0.08 | 0.2 | 2.5 | — | 5.0 | — | — | 0.05 |
| D | 0.08 | 0.2 | 2.5 | — | 2.5 | 1.25 | 1 | 0.05 |
| E | 0.08 | 0.2 | 2.5 | — | 5.0 | 1.25 | 1 | 0.05 |
| F | 0.08 | 0.2 | 2.5 | — | — | 1.25 | — | 0.05 |
| G | 0.15 | 0.2 | 3.5 | 1 | — | — | — | 0.05 |

Fig. 4

| Test no. | Steel | Wire | Chemical compositions of weld metal (1) (mass%) | | | | | | | | Al/O | Pcm |
|---|---|---|---|---|---|---|---|---|---|---|---|---|
| | | | C | Si | Mn | Ti | B | Al | O | N | | |
| 1 | 1 | A | 0.08 | 0.05 | 1.21 | 0.012 | 0.0003 | 0.011 | 0.027 | 0.0033 | *0.41 | 0.214 |
| 2 | 2 | A | 0.06 | 0.11 | 1.24 | 0.007 | 0.0011 | 0.012 | 0.032 | 0.0032 | *0.38 | 0.223 |
| 3 | 3 | B | 0.06 | 0.18 | 1.48 | 0.015 | 0.0010 | 0.009 | 0.025 | 0.0053 | *0.35 | 0.228 |
| 4 | 4 | C | 0.05 | 0.16 | 1.12 | 0.012 | 0.0006 | 0.008 | 0.033 | 0.0043 | *0.24 | 0.230 |
| 5 | 5 | B | 0.11 | 0.11 | 0.87 | 0.007 | 0.0011 | 0.015 | 0.026 | 0.0032 | *0.58 | 0.238 |
| 6 | 6 | C | 0.12 | 0.18 | 1.64 | 0.013 | 0.0009 | 0.010 | 0.025 | 0.0050 | *0.40 | 0.245 |
| 7 | 7 | D | 0.08 | 0.19 | 1.64 | 0.018 | 0.0007 | 0.009 | 0.026 | 0.0048 | *0.34 | 0.258 |
| 8 | 8 | E | 0.08 | 0.16 | 1.07 | 0.014 | 0.0008 | 0.011 | 0.029 | 0.0046 | *0.38 | 0.270 |
| 9 | 9 | E | 0.08 | 0.16 | 1.04 | 0.013 | 0.0010 | 0.011 | 0.028 | 0.0047 | *0.39 | 0.275 |
| 10 | 10 | E | 0.06 | 0.17 | 1.17 | 0.012 | 0.0008 | 0.009 | 0.028 | 0.0046 | *0.32 | 0.278 |
| 11 | 11 | E | 0.08 | 0.18 | 1.37 | 0.013 | 0.0007 | 0.010 | 0.025 | 0.0063 | *0.39 | 0.280 |
| 12 | 12 | D | 0.09 | 0.18 | 1.64 | 0.018 | 0.0008 | 0.010 | 0.028 | 0.0046 | *0.36 | 0.287 |
| 13 | 13 | E | 0.08 | 0.18 | 1.61 | 0.018 | 0.0008 | 0.007 | 0.028 | 0.0050 | *0.25 | 0.289 |
| 14 | 14 | E | 0.06 | 0.16 | 1.32 | 0.012 | 0.0007 | 0.008 | 0.030 | 0.0039 | *0.27 | 0.292 |
| 15 | 15 | E | 0.08 | 0.18 | 1.17 | 0.012 | 0.0009 | 0.013 | 0.028 | 0.0042 | *0.46 | 0.299 |
| 16 | 16 | E | 0.09 | 0.16 | 1.46 | 0.013 | 0.0006 | 0.009 | 0.028 | 0.0049 | *0.32 | 0.300 |
| 17 | 17 | E | 0.10 | 0.15 | 1.56 | 0.014 | 0.0006 | 0.014 | 0.031 | 0.0052 | *0.46 | 0.310 |
| 18 | 18 | D | 0.07 | 0.19 | 1.28 | 0.010 | 0.0006 | 0.030 | 0.027 | 0.0064 | 1.11 | *0.241 |
| 19 | 19 | D | 0.06 | 0.20 | 1.70 | 0.010 | 0.0004 | 0.028 | 0.024 | 0.0057 | 1.17 | *0.242 |
| 20 | 20 | E | 0.06 | 0.20 | 1.49 | 0.010 | 0.0006 | 0.021 | 0.025 | 0.0021 | 0.84 | *0.243 |
| 21 | 21 | E | 0.07 | 0.19 | 1.06 | 0.010 | 0.0006 | 0.025 | 0.029 | 0.0087 | 0.86 | *0.247 |
| 28 | 28 | D | 0.07 | 0.21 | 1.75 | 0.011 | 0.0007 | 0.011 | 0.026 | 0.0031 | *0.42 | 0.276 |
| 33 | 33 | D | 0.07 | 0.23 | 1.77 | 0.009 | 0.0007 | 0.044 | 0.027 | 0.0033 | *1.63 | 0.265 |
| 43 | 43 | E | 0.08 | 0.21 | 1.74 | 0.011 | 0.0006 | 0.053 | *0.061 | 0.0033 | 0.87 | 0.301 |
| 44 | 44 | G | 0.14 | 0.15 | 2.51 | 0.013 | 0.0015 | 0.024 | 0.030 | 0.0043 | 0.80 | *0.333 |
| 22 | 22 | E | 0.07 | 0.20 | 1.65 | 0.009 | 0.0005 | 0.021 | 0.029 | 0.0081 | 0.72 | 0.252 |
| 23 | 23 | E | 0.07 | 0.19 | 1.57 | 0.010 | 0.0006 | 0.027 | 0.028 | 0.0054 | 0.96 | 0.255 |
| 24 | 24 | F | 0.11 | 0.21 | 1.81 | 0.018 | 0.0007 | 0.031 | 0.026 | 0.0048 | 1.19 | 0.261 |
| 25 | 25 | A | 0.10 | 0.16 | 1.54 | 0.013 | 0.0010 | 0.034 | 0.029 | 0.0050 | 1.17 | 0.264 |
| 26 | 26 | C | 0.12 | 0.18 | 2.10 | 0.010 | 0.0009 | 0.018 | 0.028 | 0.0043 | 0.64 | 0.265 |
| 27 | 27 | A | 0.12 | 0.24 | 1.99 | 0.005 | 0.0003 | 0.011 | 0.016 | 0.0089 | 0.69 | 0.266 |
| 29 | 29 | D | 0.07 | 0.18 | 1.74 | 0.011 | 0.0004 | 0.018 | 0.027 | 0.0032 | 0.67 | 0.273 |
| 30 | 30 | D | 0.07 | 0.19 | 1.74 | 0.010 | 0.0005 | 0.023 | 0.026 | 0.0044 | 0.88 | 0.266 |
| 31 | 31 | D | 0.07 | 0.23 | 1.77 | 0.015 | 0.0011 | 0.029 | 0.027 | 0.0024 | 1.07 | 0.275 |
| 32 | 32 | D | 0.07 | 0.21 | 1.74 | 0.007 | 0.0008 | 0.034 | 0.026 | 0.0021 | 1.31 | 0.267 |
| 34 | 34 | E | 0.07 | 0.19 | 1.82 | 0.011 | 0.0006 | 0.021 | 0.025 | 0.0043 | 0.84 | 0.266 |
| 35 | 35 | E | 0.09 | 0.19 | 1.26 | 0.011 | 0.0009 | 0.020 | 0.026 | 0.0041 | 0.77 | 0.277 |
| 36 | 36 | E | 0.08 | 0.19 | 1.44 | 0.010 | 0.001 | 0.023 | 0.028 | 0.0042 | 0.82 | 0.278 |
| 37 | 37 | E | 0.07 | 0.19 | 1.76 | 0.010 | 0.0005 | 0.024 | 0.030 | 0.0055 | 0.80 | 0.280 |
| 38 | 38 | E | 0.07 | 0.21 | 1.75 | 0.010 | 0.0005 | 0.031 | 0.038 | 0.0041 | 0.82 | 0.283 |
| 39 | 39 | E | 0.07 | 0.20 | 1.70 | 0.009 | 0.0005 | 0.022 | 0.027 | 0.0033 | 0.81 | 0.291 |
| 40 | 40 | C | 0.13 | 0.40 | 2.40 | 0.014 | 0.0007 | 0.024 | 0.028 | 0.0046 | 0.87 | 0.299 |
| 41 | 41 | E | 0.08 | 0.18 | 1.71 | 0.010 | 0.0006 | 0.024 | 0.029 | 0.0038 | 0.83 | 0.302 |
| 42 | 42 | E | 0.08 | 0.20 | 1.73 | 0.009 | 0.0008 | 0.034 | 0.038 | 0.0029 | 0.89 | 0.301 |

1) Mark * attached to a numerical value indicates it is out of the range defined as this invention.
2) Test no. 1-21, 28, 33, 43-44 are examples for comparison and the other tests are those for this invention.

Fig.5

| Test no. | Steel | Wire | Chemical compositions of weld metal (2) (mass%:balFe) | | | | | | | |
|---|---|---|---|---|---|---|---|---|---|---|
| | | | P | S | Cu | Ni | Cr | Mo | V | Nb |
| 1 | 1 | A | 0.007 | 0.001 | — | 1.1 | 0.5 | 0.4 | — | 0.01 |
| 2 | 2 | A | 0.011 | 0.002 | 0.8 | 1.5 | — | 0.4 | — | — |
| 3 | 3 | B | 0.006 | 0.001 | 0.2 | 1.6 | — | 0.6 | 0.04 | 0.03 |
| 4 | 4 | C | 0.006 | 0.001 | 0.8 | 2.0 | 0.7 | — | — | — |
| 5 | 5 | B | 0.011 | 0.002 | — | 1.5 | — | 0.7 | 0.04 | — |
| 6 | 6 | C | 0.008 | 0.001 | — | 2.0 | — | — | — | — |
| 7 | 7 | D | 0.007 | 0.001 | — | 1.4 | 0.7 | 0.4 | 0.05 | 0.05 |
| 8 | 8 | E | 0.008 | 0.001 | 0.2 | 2.1 | 0.8 | 0.7 | 0.02 | 0.01 |
| 9 | 9 | E | 0.007 | 0.001 | 0.2 | 2.6 | 0.7 | 0.6 | 0.02 | 0.01 |
| 10 | 10 | E | 0.008 | 0.001 | 0.9 | 2.0 | 0.7 | 0.5 | 0.02 | 0.01 |
| 11 | 11 | E | 0.005 | 0.001 | 0.2 | 2.3 | 0.7 | 0.5 | 0.03 | 0.02 |
| 12 | 12 | D | 0.007 | 0.001 | — | 1.4 | 0.7 | 0.6 | 0.06 | 0.05 |
| 13 | 13 | E | 0.007 | 0.001 | 0.2 | 1.7 | 0.8 | 0.5 | 0.03 | 0.03 |
| 14 | 14 | E | 0.006 | 0.001 | 0.8 | 2.1 | 0.7 | 0.6 | 0.02 | 0.01 |
| 15 | 15 | E | 0.007 | 0.001 | 0.9 | 2.0 | 0.8 | 0.5 | 0.02 | 0.01 |
| 16 | 16 | E | 0.007 | 0.001 | 0.4 | 2.0 | 0.6 | 0.6 | 0.04 | 0.03 |
| 17 | 17 | E | 0.008 | 0.001 | 0.2 | 2.2 | 0.7 | 0.7 | 0.02 | 0.01 |
| 18 | 18 | D | 0.006 | 0.002 | — | 1.7 | 0.6 | 0.6 | — | 0.01 |
| 19 | 19 | D | 0.006 | 0.002 | — | 1.4 | 0.7 | 0.4 | 0.02 | 0.02 |
| 20 | 20 | E | 0.006 | 0.002 | 0.2 | 1.6 | 0.6 | 0.4 | 0.02 | 0.01 |
| 21 | 21 | E | 0.005 | 0.002 | 0.2 | 2.0 | 0.6 | 0.6 | 0.02 | 0.01 |
| 28 | 28 | D | 0.011 | 0.002 | 0.2 | 1.5 | 0.6 | 0.6 | 0.03 | 0.03 |
| 33 | 33 | D | 0.008 | 0.001 | 0.2 | 1.5 | 0.5 | 0.5 | 0.02 | 0.03 |
| 43 | 43 | E | 0.004 | 0.002 | 0.2 | 2.4 | 0.6 | 0.6 | 0.02 | 0.01 |
| 44 | 44 | G | 0.012 | 0.013 | 1.1 | — | — | — | — | — |
| 22 | 22 | E | 0.006 | 0.002 | 0.2 | 1.5 | 0.6 | 0.3 | 0.03 | 0.03 |
| 23 | 23 | E | 0.006 | 0.002 | 0.2 | 1.7 | 0.6 | 0.5 | 0.02 | 0.02 |
| 24 | 24 | F | 0.007 | 0.001 | — | — | 1.0 | — | — | — |
| 25 | 25 | A | 0.006 | 0.001 | — | 1.0 | — | 0.9 | — | — |
| 26 | 26 | C | 0.004 | 0.002 | — | 1.5 | — | — | 0.04 | — |
| 27 | 27 | A | 0.011 | 0.015 | 0.5 | 0.7 | — | — | — | 0.04 |
| 29 | 29 | D | 0.011 | 0.003 | 0.2 | 1.5 | 0.6 | 0.6 | 0.03 | 0.03 |
| 30 | 30 | D | 0.006 | 0.002 | 0.2 | 1.5 | 0.6 | 0.6 | 0.03 | 0.03 |
| 31 | 31 | D | 0.012 | 0.001 | 0.2 | 1.5 | 0.5 | 0.6 | 0.03 | 0.02 |
| 32 | 32 | D | 0.012 | 0.001 | 0.2 | 1.4 | 0.6 | 0.5 | 0.02 | 0.03 |
| 34 | 34 | E | 0.004 | 0.002 | — | 1.5 | 0.7 | 0.5 | 0.03 | 0.02 |
| 35 | 35 | E | 0.004 | 0.002 | — | 2.0 | 0.7 | 0.6 | 0.02 | 0.01 |
| 36 | 36 | E | 0.004 | 0.002 | 0.2 | 2.0 | 0.6 | 0.6 | 0.02 | 0.01 |
| 37 | 37 | E | 0.006 | 0.002 | 0.2 | 1.9 | 0.5 | 0.6 | 0.02 | 0.01 |
| 38 | 38 | E | 0.007 | 0.002 | 0.2 | 1.7 | 0.6 | 0.6 | 0.02 | 0.01 |
| 39 | 39 | E | 0.005 | 0.002 | 0.2 | 2.7 | 0.6 | 0.6 | 0.02 | 0.01 |
| 40 | 40 | C | 0.006 | 0.001 | — | 2.0 | — | — | — | — |
| 41 | 41 | E | 0.004 | 0.002 | 0.2 | 2.3 | 0.7 | 0.6 | 0.02 | 0.01 |
| 42 | 42 | E | 0.004 | 0.002 | 0.2 | 2.1 | 0.7 | 0.6 | 0.02 | 0.01 |

1) Test no. 1-21, 28, 33, 43-44 are examples for comparison and the other tests are those for this invention.

Fig. 6

| Test no. | Tensile test TS (MPa) | Charpy impact test Upper shelf energy(J) | Charpy impact test Transition temp. (°C) |
|---|---|---|---|
| 1 | * 760 | 170 | <-60 |
| 2 | * 791 | 164 | <-60 |
| 3 | * 820 | 161 | <-60 |
| 4 | * 831 | 155 | -55 |
| 5 | * 855 | 154 | <-60 |
| 6 | * 872 | 160 | <-60 |
| 7 | * 890 | 162 | <-60 |
| 8 | * 866 | 166 | <-60 |
| 9 | * 898 | 154 | <-60 |
| 10 | * 865 | 158 | -57 |
| 11 | * 881 | 148 | <-60 |
| 12 | * 860 | 165 | -55 |
| 13 | * 895 | 147 | -51 |
| 14 | * 863 | 144 | -59 |
| 15 | * 894 | 166 | -51 |
| 16 | * 884 | 136 | -55 |
| 17 | * 887 | 110 | * -46 |
| 18 | * 857 | 202 | * >20 |
| 19 | * 873 | 172 | * >20 |
| 20 | * 873 | 200 | * 3 |
| 21 | * 881 | 190 | * -15 |
| 28 | * 867 | 221 | -51 |
| 33 | 938 | * 68 | * -21 |
| 43 | 1033 | * 46 | * -47 |
| 44 | 1100 | * 49 | * -41 |
| 22 | 903 | 205 | -52 |
| 23 | 911 | 193 | -57 |
| 24 | 931 | 162 | -56 |
| 25 | 920 | 161 | <-60 |
| 26 | 911 | 181 | -51 |
| 27 | 932 | 162 | -52 |
| 29 | 911 | 192 | -54 |
| 30 | 923 | 183 | <-60 |
| 31 | 933 | 174 | -57 |
| 32 | 937 | 124 | -51 |
| 34 | 931 | 146 | -57 |
| 35 | 962 | 119 | -52 |
| 36 | 975 | 101 | -57 |
| 37 | 954 | 149 | <-60 |
| 38 | 925 | 189 | <-60 |
| 39 | 998 | 140 | -57 |
| 40 | 1002 | 173 | <-60 |
| 41 | 1050 | 111 | -58 |
| 42 | 1020 | 96 | -54 |

1) Mark * attached to a test result shows it doesn't attain the aimed level.
2) Test no. 1-21, 28, 33, 43, 44 are examples for comparison and the other tests are those for this invention.

Chemical compositions of weld metal (mass% : bal.Fe)

| C | Si | Mn | Ni | Cr | Mo | V | Nb | Ti | Al | B | O | Al/O | Pcm | Ceq |
|---|---|---|---|---|---|---|---|---|---|---|---|---|---|---|
| 0.08 | 0.2 | 1.45 | 2.5 | 0.65 | 0.65 | 0.02 | 0.01 | 0.01 | 0.023 | 0.001 | 0.027 | 0.85 | 0.29 | 0.69 |

Fig. 9

| Tensile test | Impact test | |
|---|---|---|
| TS (MPa) | vE-20 (J) | vTs (°C) |
| 1050 | 105 | −53 |

Fig. 10

| Test no. | Chemical compositions of weld metal (mass%: bal. Fe) | | | | | | | | | | | | | | | | | Al/O | Ceq | Pcm |
|---|---|---|---|---|---|---|---|---|---|---|---|---|---|---|---|---|---|---|---|---|
| | C | Si | Mn | P | S | Cu | Ni | Cr | Mo | V | Nb | Ti | B | Total Al | O | N | | | | |
| 1 | 0.06 | 0.21 | 1.04 | 0.004 | 0.003 | 0.19 | 0.51 | 0.85 | 0.82 | 0.019 | 0.005 | 0.013 | 0.0007 | 0.026 | 0.027 | 0.0043 | 0.96 | *0.63 | 0.240 |
| 2 | 0.06 | 0.21 | 1.14 | 0.004 | 0.003 | 0.19 | 3.32 | 1.51 | 1.23 | 0.019 | 0.005 | 0.013 | 0.0007 | 0.026 | 0.025 | 0.0041 | 1.04 | *0.96 | 0.352 |
| 3 | 0.08 | 0.20 | 1.44 | 0.005 | 0.002 | 0.01 | 2.30 | 0.74 | 0.64 | 0.020 | 0.014 | 0.014 | 0.0006 | 0.011 | 0.027 | 0.0045 | *0.41 | 0.70 | 0.280 |
| 4 | 0.07 | 0.20 | 1.46 | 0.004 | 0.002 | 0.01 | 2.23 | 0.73 | 0.63 | 0.020 | 0.013 | 0.013 | 0.0005 | 0.041 | 0.026 | 0.0047 | *1.58 | 0.69 | 0.274 |
| 5 | 0.07 | 0.20 | 1.44 | 0.004 | 0.002 | 0.01 | 2.21 | 0.73 | 0.63 | 0.020 | 0.013 | 0.012 | 0.0006 | 0.051 | *0.072 | 0.0041 | 0.71 | 0.69 | 0.274 |
| 6 | 0.06 | 0.21 | 1.13 | 0.005 | 0.003 | 0.19 | 3.13 | 0.85 | 0.81 | 0.018 | 0.005 | 0.013 | 0.0008 | 0.026 | 0.027 | 0.0047 | 0.96 | 0.71 | 0.287 |
| 7 | 0.08 | 0.20 | 1.42 | 0.005 | 0.002 | 0.01 | 2.24 | 0.73 | 0.63 | 0.019 | 0.013 | 0.012 | 0.0007 | 0.021 | 0.028 | 0.0051 | 0.75 | 0.69 | 0.275 |
| 8 | 0.08 | 0.21 | 1.41 | 0.005 | 0.002 | 0.02 | 2.29 | 0.73 | 0.63 | 0.019 | 0.013 | 0.011 | 0.0006 | 0.028 | 0.025 | 0.0065 | 1.12 | 0.69 | 0.277 |

1) Mark * attached to a numerical value indicates it is out of the range defined as this invention.
2) Test no. 1-5 are examples for comparison and test no. 6-8 are those for this invention.

Fig. 11

| Test no. | Tensile test TS (MPa) | Impact test | |
|---|---|---|---|
| | | Upper shelf energy (J) | Transition temp. (°C) |
| 1 | *880 | 154 | -51 |
| 2 | 1150 | *35 | -35 |
| 3 | *875 | 164 | -53 |
| 4 | 1057 | *51 | -23 |
| 5 | 916 | *41 | -45 |
| 6 | 976 | 112 | -52 |
| 7 | 983 | 117 | -52 |
| 8 | 1013 | 98 | -52 |

1) Mark * attached to a test result shows it doesn't attain the aimed level.
2) Test no. 1-5 are examples for comparison and test no. 6-8 are those for this invention.

WELDED HIGH-STRENGTH STEEL STRUCTURES AND METHOD OF MANUFACTURING THE SAME

TECHNICAL FIELD

The present invention relates to welded high-strength steel structures, such as welded steel pipes, pipelines, marine structures, pressure vessels, and tanks, formed from steel having a tensile strength (TS) of not less than 900 MPa and excellent low-temperature toughness, as well as to methods of manufacturing the same.

BACKGROUND ART

In pipelines for long-distance conveyance of natural gas, crude oil, and the like, conveyance efficiency is improved through increasing running pressure, whereby conveyance cost is reduced. In order to increase running pressure, the wall thickness of pipe must be increased, or the strength of pipe material must be increased. However, the increase of the wall thickness of pipe involves impairment of field weldability and the necessity of enhancing the foundation structure to cope with an increase in pipeline weight. Under these circumstances, there have been increasing needs for enhancing the strength of welded steel pipes. For example, recently, American Petroleum Institute (API) has standardized X80 grade welded steel pipes having a yield strength (YS) of not less than 551 MPa and a TS of not less than 620 MPa, and put them into practical use.

As a result of enhancement of the strength of welded steel pipes, the manufacture of welded steel pipes of up to X100 grade (YS: not less than 689 MPa; TS: not less than 760 MPa) based on the technique for manufacturing X80 grade welded steel pipes is known to be feasible. Furthermore, there has been proposed high-tensile-strength steel having excellent low-temperature toughness and field weldability and a TS of not less than 950 MPa (Japanese Patent Application Laid-Open (kokai) Nos. 8-104922 and 8-209291).

As far as low-temperature toughness and resistance to cold weld cracking at a relatively small heat input are concerned, the manufacture of steel products used for welded high-strength steel pipes is feasible through the above-mentioned technical development. However, the manufacture of high-strength welded steel pipes requires not only the above-mentioned high-tensile-strength steel but also high-strength weld metal having appropriate toughness. It has been known that the toughness of weld metal is improved through refinement of microstructure. Specifically, there emerges a wide practical use of a weld metal in which fine "acicular ferrite" is formed by adjusting the Al/O (oxygen) value through addition of trace Ti and B into the weld metal. However, generally, strength attained by acicular ferrite is limited. Acicular ferrite in weld metal cannot stably provide a TS of not less than 900 MPa. Accordingly, in order to obtain a TS of 900 MPa while appropriate toughness is provided, another method must be employed. Particularly, when welding heat input is increased in order to improve efficiency of welding, the cooling rate of weld metal decreases. Accordingly, a TS of not less than 900 MPa becomes difficult to attain.

DISCLOSURE OF THE INVENTION

An object of the present invention is to provide welded high-strength steel structures (welded steel pipes, pipelines, marine structures, and the like) having low-temperature toughness and a TS of not less than 900 MPa even when welded at an input heat of up to 10 kJ/mm, as well as to provide a method of manufacturing the same. Particularly, an object of the present invention is to provide welded steel pipes whose weld metal has the following performance characteristics.

Tensile performance: TS≧900 MPa

Impact performance: Upper shelf energy ≧80J; transition temperature of fracture appearance vTs<−50° C.

Generally, as temperature decreases, steel becomes brittler, and brittle cracking is more likely to be initiated from a smaller defect. The transition temperature vTs of fracture appearance serves as a measure temperature at which brittle fracture is not initiated from a defect so small as and undetectable one through ordinary nondestructive testing. The lower the vTs, the less likely the initiation of brittle fracture. Upper shelf energy serves as an index indicating how much energy the propagation of ductile fracture requires. The higher the upper shelf energy, the less likely the initiation of unstable ductile fracture.

Figure 1:
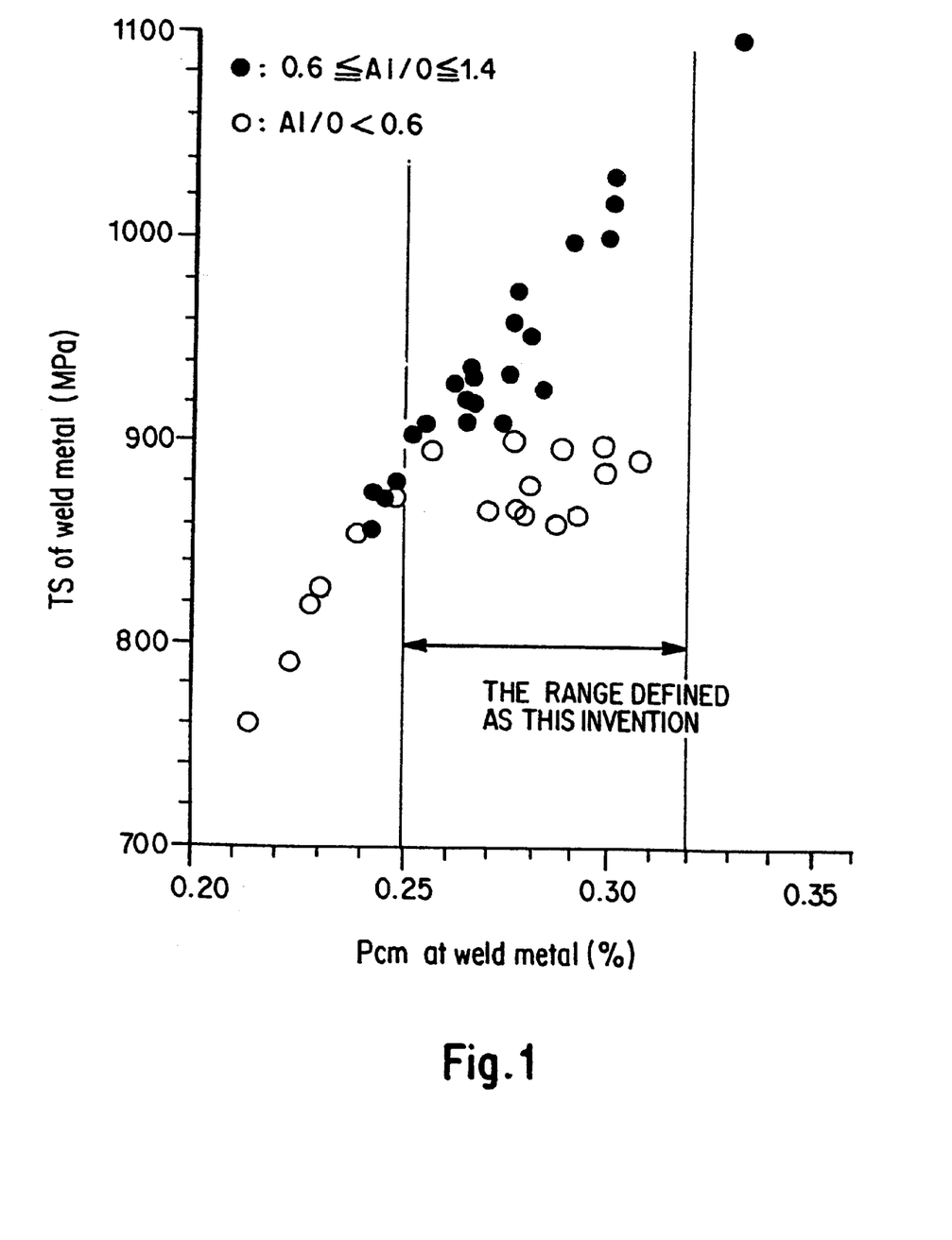
FIG. 1 is a graph showing the relationship between TS and Pcm in weld metal.

To achieve the above objects, the inventors of the present invention manufactured various welded joints by submerged arc welding (SAW) and gas metal arc welding (GMAW) and tested their strength and low-temperature toughness. Specifically, through use of base metals and wires having various compositions and fluxes having different basic indexes, the metallic components of weld metal and the oxygen content of weld metal were varied. The oxygen content of weld metal formed by SAW was primarily adjusted through variation of the composition of flux. The thus-obtained weld metals were tested for low-temperature toughness, and the following was confirmed.

a) As shown in FIG. 1, the TS of weld metal increases with Pcm(defined later), and some weld metals show a TS of not less than 900 MPa at a Pcm of 0.25% or greater.

b) For weld metals having a TS of not less than 900 MPa, lower bainite occupies a considerable ratio in the microstructure. By contrast, weld metals having a TS of less than 900 MPa show a microstructure composed primarily of fine acicular ferrite.

c) As seen from comparison among weld metals having identical values of Pcm, weld metals having an Al/O (oxygen) value greater than 0.6 show a marked increase in TS. Also, at a Pcm of 0.25% or greater, the percentage of lower bainite increases with the Al/O value. At an Al/O value of 1.2 or greater, lower bainite becomes dominant in the microstructure. At a Pcm of 0.25% or greater and an Al/O value of 0.6 to 1.2, only a mixed structure of acicular ferrite and lower bainite is observed, and upper bainite is hardly observed.

d) When the microstructure changes from acicular ferrite to upper bainite with increasing Al/O, there occurs a significant impairment (increase) in the transition temperature of fracture appearance. By contrast, when the microstructure changes from acicular ferrite to lower bainite, toughness is hardly impaired.

e) Upper shelf energy decreases with increasing strength of weld metal and with increasing oxygen content of weld metal.

The gist of the present invention is to provide the following welded high-strength steel structures and the following method of manufacturing the same. In the following description, "%" accompanying an alloy element refers to "% by weight" or "wt. %" unless otherwise specified.

(1) A welded high-strength steel structure, wherein a base metal is a steel whose microstructure is substantially formed of a mixed structure of martensite and lower bainite and which has a tensile strength of not less than 900 MPa; and a weld metal is a steel which contains O (oxygen) in an amount not greater than 0.06 wt %, satisfies equations 1) and 2) below, and has a tensile strength of not less than 900 MPa.

$$0.25 \leq Pcm \leq 0.32$$

$$Pcm = C+(Si/30)+(Mn/20)+(Ni/60)+(Cu/20)+(Cr/20)+(Mo/15)+(V/10)+5B \quad 1)$$

$$0.6 \leq Al/O \text{ (oxygen)} \leq 1.4 \quad 2)$$

wherein each atomic symbol in equations 1) and 2) represents its content (wt %) within the steel.

(2) A welded high-strength steel structure, wherein a base metal is a steel whose microstructure is substantially formed of a mixed structure of martensite and lower bainite and which has a tensile strength of not less than 900 MPa; and a weld metal is a steel which comprises the following elements by weight %: C: 0.01% to 0.15%; Si: 0.02% to 0.6%; Mn: 0.6% to 3%; Al: 0.004% to 0.08%; Ti: 0.003% to 0.03%; O (oxygen): not greater than 0.06%; B: 0.0002% to 0.005%; Cu: 0% to 1.2%; Ni: 0% to 3%; Cr: 0% to 1.2%; Mo: 0% to 1%; V: 0% to 0.05%; and Nb: 0% to 0.05%, and satisfies the above-described equations 1) and 2).

(3) A welded high-strength steel structure described above in (1) or (2), wherein the tensile strength of the weld metal is greater by 20–150 MPa than that of the base metal.

(4) A welded high-strength steel structure described above in (3), wherein the base metal contains B of 0.0002 wt % to 0.0025 wt % and Ceq of 0.4% to 0.58%; and the Ceq of the weld metal is greater by 0.08% to 0.3% than that of the base metal.

(5) A welded high-strength steel structure described above in (3), wherein the base metal contains substantially no B and Ceq of 0.53% to 0.7%; and the Ceq value of the weld metal is greater by 0.05% to 0.2% than that of the base metal.

(6) A method of manufacturing a welded steel pipe as the welded high-strength steel structure described above in (1) or (2), the method comprising the steps of bending a steel plate into a tubular shape, and seam-welding butted ends of the steel plate through submerged arc welding.

(7) A method of manufacturing a welded steel pipe as the welded high-strength steel structure described above in (4), the method comprising the steps of bending a steel plate into a tubular shape, and seam-welding butted ends of the steel plate through submerged arc welding.

(8) A method of manufacturing a welded steel pipe as the welded high-strength steel structure described above in (5), the method comprising the steps of bending a steel plate into a tubular shape, and seam-welding butted ends of the steel plate through submerged arc welding.

(9) A method of manufacturing a welded steel pipe as the welded high-strength steel structure described above in (1) or (2), wherein seam-welding is carried out through submerged arc welding at heat input of 3–10 kJ/mm.

(10) A method of manufacturing a pipeline comprising the steps of butting together the end portions of adjacent two steel pipes having a tensile strength of not less than 900 MPa, and welding the circumferences of the butted portions through gas metal arc welding, wherein the weld metal of the welded circumference portion is a steel which contains O (oxygen) in an amount not greater than 0.06 wt %, satisfies the equations 1) and 2) above, and has a tensile strength of not less-than 900 MPa.

(11) A method of manufacturing a pipeline comprising the steps of butting together the end portions of adjacent two steel pipes having a tensile strength of not less than 900 MPa, and welding the circumferences of the butted portions through gas metal arc welding, wherein the weld metal of the welded circumference portion is a steel which has the following element by weight %: C: 0.01% to 0.15%; Si: 0.02% to 0.6%; Mn: 0.6% to 3%; Al: 0.004% to 0.08%; Ti: 0.003% to 0.03%; O (oxygen): not greater than 0.06%; B: 0.0002% to 0.005%; Cu: 0% to 1.2%; Ni: 0% to 3%; Cr: 0% to 1.2%; Mo: 0% to 1%; V: 0% to 0.05%; and Nb: 0% to 0.05%, and satisfies the equations 1) and 2) above.

(12) A method of manufacturing a pipeline as described above in (10) or (11), wherein the tensile strength of the weld metal of the welded circumference portion is greater by 20–150 MPa than that of the base metal.

In (1), (2), (3), (4), and (5) described above, the base metal primarily refers to a steel plate, but may be a hot rolled coiled steel, a seamless steel pipe, or a welded steel pipe. When the base metal is a welded steel pipe, the welded steel structure of the invention refers to a pipeline. The "welded steel structure" may be a marine structure, a tank, or a like structure. When most of the base metal is the steel described above, a structure composed of the base metal with attachments of other metal is encompassed by the scope of the present invention.

In (6), (7), (8), and (9) described above, the base metal refers to a steel plate or a hot rolled coiled steel, and the "method of manufacturing a welded steel structure" of the invention is limited to the "method of manufacturing a welded steel pipe." In (10), (11), and (12) described above, the base metal is a seamless steel pipe or a welded steel pipe, and the "method of manufacturing a welded steel structure" of the invention is limited to the "method of manufacturing a pipeline."

In (1), (2), (3), (4), and (5) described above, the "welded steel structure" also refers to a steel structure formed by a method of welding other than submerged arc welding or gas metal arc welding.

In (9) described above, in the case of multi-electrode welding with one molten metal pool, the heat input of welding refers to the total heat input of the electrodes per pass.

In (1), (2), (3), (4), and (5) described above, when the base metal is a welded steel pipe, the base metal, i.e. the welded steel pipe, consists of a weld metal portion and a portion which was formerly a steel plate. The limitation on the base metal, i.e. the phrase "a base metal is a steel material whose microstructure is formed of a mixed structure of martensite and lower bainite," is applied only to the portion which was formerly a steel plate and is not applied to the weld metal portion. Also, the limitation on Ceq is applied only to the portion which was formerly a steel plate. In this case, "weld metal" corresponds to that of a welded circumference portion or that of a seam-welded portion.

BRIEF DESCRIPTION OF DRAWINGS

FIG. 3 is a table showing the chemical compositions of base metals (steel plates) used in Test 1 of EXAMPLES;

FIG. 5 is a table showing the chemical compositions of weld metals tested in Test 1 of EXAMPLES, showing the contents of main elements;

FIG. 6 is a table showing the chemical compositions of weld metals tested in Test 1 of EXAMPLES, showing the contents of optional elements;

FIG. 10 is a table showing the chemical compositions of weld metals tested in Test 3 of EXAMPLES; and FIG. 11 is a table showing the result of Test 3 of EXAMPLES.

BEST MODE FOR CARRYING OUT THE INVENTION

The reason for the above-described limitations as defined in the present invention will now be described.

1. Base Metal

TS and Microstructure:

The present invention is applied to welded high-strength steel structures having a TS of not less than 900 MPa. Accordingly, the TS of base metal must be not less than 900 MPa. Also, in order to impart favorable toughness to base metal, the microstructure of base metal is a mixed structure of martensite and lower bainite. When the microstructure of base metal is a single phase of martensite or contains partially formed upper bainite, the toughness of base material does not reach a target level.

In the above-described manufacturing methods (10), (11), and (12) of the present invention, a steel pipe is only required to have a TS of not less than 900 MPa. However, preferably, the microstructure of the steel plate portion (the portion other than weld metal) of a welded steel pipe or the microstructure of a seamless steel pipe is a mixed structure of martensite and lower bainite, and carbon equivalent falls within the above-mentioned range according to whether B is contained or not.

B and Ceq:

B is added as needed. In the portion of steel ranging from the surface layer portion to the center portion in the thickness direction, in order to form the above-mentioned mixed structure, hardenability must be adjusted. The effect of C, Mn, Cu, Ni, Cr, Mo, and V on hardenability is evaluated by means of carbon equivalent, Ceq, whose definition incorporates the contents of the above elements. In the present invention, the definition of Ceq does not incorporate boron content. However, since even a trace amount of B contributes significantly to the enhancement of hardenability, the contribution of B must be considered.

When B is contained, carbon equivalent is lower than that of B-free steel in order to avoid excessively hardened microstructure. That is, Ceq of B-containing steel is set to be 0.4% to 0.58%. At a Ceq value of less than 0.4%, even when the effect of B is sufficiently obtained, a TS of 900 MPa cannot be reliably obtained. Accordingly, a Ceq value should not be less than 0.4%. By contrast, at a Ceq value greater than 0.58%, when the effect of B is exhibitively involved, hardenability becomes excessively high, and consequently toughness is impaired. Therefore, a Ceq value of not greater than 0.58% is used.

In order to obtain the stable effect of B, a boron content should be not less than 0.0002%. By contrast, if the boron content is in excess of 0.0025%, the toughness of HAZ is significantly impaired. Therefore, the upper limit of the boron content is preferably determined to be 0.0025%. In order to obtain sufficient toughness and hardenability of HAZ, the boron content is preferably 0.0005% to 0.002%.

B does not have the effect to enhance the hardenability on a zone adjacent to the weld metal of HAZ. Thus, hardening is lowered by a degree corresponding to a reduction of the Ceq value, whereby weld crack susceptibility is decreased. However, B tends to increase the average lengths of martensite and lower bainite in their growing directions. Thus, when some increase in weld crack susceptibility is acceptable and excellent toughness must be attained, B is not used. B, when contained in an amount of less than 0.0002%, does not exhibit the effect to enhance the hardenability. Accordingly, the case in which B is substantially not contained, i.e. B-free steel, indicates a boron content of less than 0.0002%. For B-free steel, a Ceq value of 0.53% to 0.7% is used in order to obtain required hardenability of base metal. If the Ceq value is less than 0.53%, hardenability becomes insufficient, resulting in a failure to obtain a TS of not less than 900 MPa. By contrast, if the Ceq value is in excess of 0.7, hardening is excessive, resulting in an impairment of arrestability. Therefore, the upper limit of the Ceq value is determined to be 0.7%.

2. Weld Metal

The chemical composition of weld metal of a welded steel structure is limited as described above for the following reasons.

O (oxygen): Not greater than 0.06%

O is contained in weld metal mostly in the form of oxides. As the oxygen content increases, upper shelf energy as obtained in the Charpy impact test decreases. Accordingly, a lower oxygen content is preferred. The upper limit of the oxygen content is 0.06%, preferably 0.04%. Although a lower oxygen content is preferred, in generally practiced fusion welding (SAW, GMAW, laser welding, and the like), the lower limit of the oxygen content is approximately 0.005%. In order to make O content not greater than 0.06 wt %, the basic index of the flux is preferably not less than 1.0.

Al/O (oxygen): 0.6 to 1.4

When the wt. % ratio between Al and O in weld metal is less than 0.6, the microstructure is dominated by acicular ferrite, and consequently a sufficiently high strength is not obtained. When the Al/O value exceeds 0.6, acicular ferrite begins to decrease, and strength begins to increase. On the contrary, when the Al/O value exceeds 1.2, acicular ferrite doesn't substantially form, and strength increases gently with the Al/O value. Thus, an excessive increase of the Al/O value is not only accompanied by an increase in strength but also induces the formation of coarse Al oxides which leads to the adverse effect on toughness. Accordingly, the upper limit of the Al/O value is determined to be 1.4. Preferably, the lower limit of the Al/O value is 0.8, and the upper limit of the Al/O value is 1.2. The method to make the value of Al/O of weld metal in the range of 0.6–1.4 will by explained later in 5.Welding Methd.

Pcm: 0.25% to 0.32%

In order to impart sufficient strength and toughness to weld metal, not only are the ranges of the contents of individual elements limited as described above, but also the range of the Pcm value must be limited. If the Pcm value is less than 0.25%, sufficient strength is not obtained, and upper bainite is formed instead of the formation of lower bainite. The formation of upper bainite leads to the significant deterioration of the transition temperature of fracture appearance. By contrast, if the Pcm value is in excess of 0.32%, strength increases excessively, and thus upper shelf energy is impaired, resulting in a failure to obtain target performance. Also, for improvement of resistance to cold cracking, a smaller Pcm value is preferred.

When the contents of alloy elements are limited as described below, the condition "a TS of not less than 900 MPa" is automatically satisfied; thus, a specific limitation on TS is not necessary. However, when the contents of alloy elements are not limited, the limitation of TS "not less than 900 MPa" must be imposed on weld metal in addition to the above-mentioned limitations of the oxygen content, Al/O value, and Pcm value.

When the following limitations are imposed on the contents of alloy elements, no limitation needs to be imposed on TS.

C: 0.01% to 0.15%

In order to obtain sufficient strength of weld metal, the carbon content must be not less than 0.01%. However, excess carbon causes an increase in the amount of precipitation of carbides and coarsening of carbides. Therefore, the upper limit of the carbon content is determined to be 0.15%. In order to obtain favorable toughness, the carbon content is preferably not greater than 0.1%, more preferably not greater than 0.08%.

Si: 0.02% to 0.6%

Si, if added, improves the strength of weld metal and exhibits the deoxidization effect. To obtain such effects, the silicon content of weld metal is not less than 0.02%. However, excess silicon causes impairment of toughness of weld metal and impairment of weld crack susceptibility. Therefore, the upper limit of the silicon content is determined to be 0.6%.

Mn: 0.6% to 3%

Mn, like Si, if added, improves the strength of weld metal and exhibits the deoxidization effect. To obtain such effects, the lower limit of the manganese content is determined to be 0.6%. However, a manganese content in excess of 3% causes impairment of toughness of weld metal and impairment of weld crack susceptibility. Therefore, the upper limit of the manganese content is determined to be 3%. For more favorable toughness and weld crack susceptibility, the manganese content is preferably not greater than 2.5%, more preferably not greater than 1.7%.

Al: 0.004% to 0.08%

Al is an important element serving as a deoxidizer. To obtain the deoxidizing effect, the lower limit of the aluminum content is determined to be 0.004%. By contrast, excess aluminum causes the formation of coarse inclusions. Therefore, the upper limit of the aluminum content is determined to be 0.08%. In the present invention, Al is a very important element because it improves the strength and toughness of weld metal through controlling the microstructure of weld metal. To make Al exhibit the effect sufficiently, the ratio of the aluminum content to the oxygen content is limited as described below.

When the aluminum content is 0.004%, in order to obtain an Al/O (oxygen) value of not greater than 1.4, the oxygen content must be not less than 0.0029%. This requirement is sufficiently met as described above in the section of the oxygen content.

Ti: 0.003% to 0.03%

Ti is an important element serving as a deoxidizer. Also, Ti prevents trace B from coupling with N, making thereby B exhibit its effect of enhancing hardenability, and thus effectively accelerates the formation of lower bainite while suppressing the formation of acicular ferrite. To obtain such effect of Ti, the lower limit of the titanium content is determined to be 0.003%. By contrast, excess titanium causes precipitation of TiC, resulting in a significant impairment of toughness of weld metal. Therefore, the upper limit of the titanium content is determined to be 0.03%.

B: 0.0002% to 0.005%

B, if added in a trace amount, significantly improves hardenability to thereby contribute to the impartment of high strength to weld metal. Accordingly, B is added in an amount of not less than 0.0002%. By contrast, excess boron impairs resistance to weld cracking. Therefore, the upper limit of the boron content is determined to be 0.005%. For better resistance to weld cracking, the boron content is preferably not greater than 0.004%, more preferably not greater than 0.003%.

Cu: 0% to 1.2%

Cu may not be contained. Since Cu contributes to the improvement of strength through precipitation hardening, Cu is added, as needed, for the purpose of obtaining high strength. However, if the copper content is in excess of 1.2%, weld cracking is likely to occur. Thus, when Cu is to be added, the copper content should not be greater than 1.2%. In order to enhance resistance to weld cracking, the copper content is not greater than 0.8%, preferably not greater than 0.6%.

Ni: 0% to 3%

Ni may not be contained. Since Ni is highly effective for increasing toughness, Ni is added, as needed, for the purpose of obtaining high toughness. However, if the nickel content is in excess of 3%, fluidity of molten steel becomes poor during welding; consequently, weld defects are likely to occur. Thus, when Ni is to be added, a nickel content of not greater than 3% is used.

Cr: 0% to 1.2%

Cr may not be contained. However, since Cr is effective for enhancing hardenability, Cr is added when acicular ferrite is apt to be formed due to a reduction in cooling rate caused by increasing welding heat input. However, if the chromium content is in excess of 1.2%, weld cracking is likely to occur. Thus, when Cr is to be added, a chromium content of not greater than 1.2% is used.

Mo: 0% to 1%

Mo may not be contained. However, since Mo is effective for enhancing hardenability and for increasing strength through precipitation hardening, Mo is added when welding heat input is to be increased or high strength is to be obtained. However, if the molybdenum content is in excess of 1%, weld cracking is likely to occur. Thus, when Mo is to be added, a molybdenum content of not greater than 1% is used.

V: 0% to 0.05%

V may not be contained. However, V is effective for increasing strength through precipitation hardening, V is added, as needed, for the purpose of obtaining high strength. If the vanadium content is in excess of 0.05%, weld cracking is likely to occur. Thus, when V is to be added, a vanadium content of not greater than 0.05% is used.

Nb: 0% to 0.05%

Nb may not be contained. However, since Nb is effective for enhancing hardenability and for increasing strength through precipitation hardening, Nb is added for the purpose of obtaining higher strength. However, if the niobium content is in excess of 0.05%, resistance to weld cracking is impaired. Thus, when Nb is to be added, a niobium content of not greater than 0.05% is used.

The contents of unavoidable impurities such as P, S, and the like are preferably low. However, the features of the present invention are not impaired so long as their contents of weld metal are as follows: P: not greater than 0.03%; S: not greater than 0.03%; and N: not greater than 0.01%.

Alloy elements of weld metal are mainly added through welding wire in both SAW and GMAW. However, alloy elements of weld metal may be added through any of base metal, welding wire, and flux. The features of the present invention are not lost so long as the final contents of alloy elements of weld metal fall within the above-described ranges.

3. Matching of Strength between Base Metal and Weld Metal in Welded Steel Structure In a welded steel structure, no special attention to matching of strength between base metal and weld metal is required so long as the components of the base metal and weld metal conform to the above-mentioned ranges of content. However, in order to avoid imposing the same distortion as that of base metal on weld metal, in which defect is likely to occur, the following matching conditions are employed.

ΔTS: 20 MPa to 150 MPa

The TS of weld metal is set higher by 20 MPa to 150 MPa than that of base metal. Under this condition, when a load is imposed on a welded joint, the base metal of the joint bears a larger distortion induced by the loading. Since weld metal is highly likely to have a defect, if the weld metal bears a distortion, the distortion concentrates at the defect, from where the brittle crack is apt to initiate. If the TS of weld metal is merely higher by less than 20 MPa than that of base metal, the weld metal is not substantially free from a burden of distortion; consequently, there remains potential initiation of brittle fracture from an internal defect of weld metal. By contrast, if the TS of weld metal is higher by more than 150 MPa than that of base metal, the strength of the weld metal becomes excessively high, and the toughness of the weld metal is significantly impaired; consequently, even a slight distortion may initiate the brittle fracture.

ΔCeq:

Next will be described the reason for employment of the difference in carbon equivalent between weld metal and base metal. Weld metal contains tens of times as high a content of O (oxygen) as that of base metal. This high-density oxygen forms oxides, which become sites of nucleation for transformation (to acicular ferrite or lower bainite). This phenomenon is utilized for improving toughness. However, since martensite is less likely to be formed in weld metal, when weld metal and base metal have identical Ceq value, the strength of the weld metal becomes lower than that of the base metal. The fact that weld metal is porous is another marked reason for the strength of weld metal being lower than that of base metal.

Figure 2:
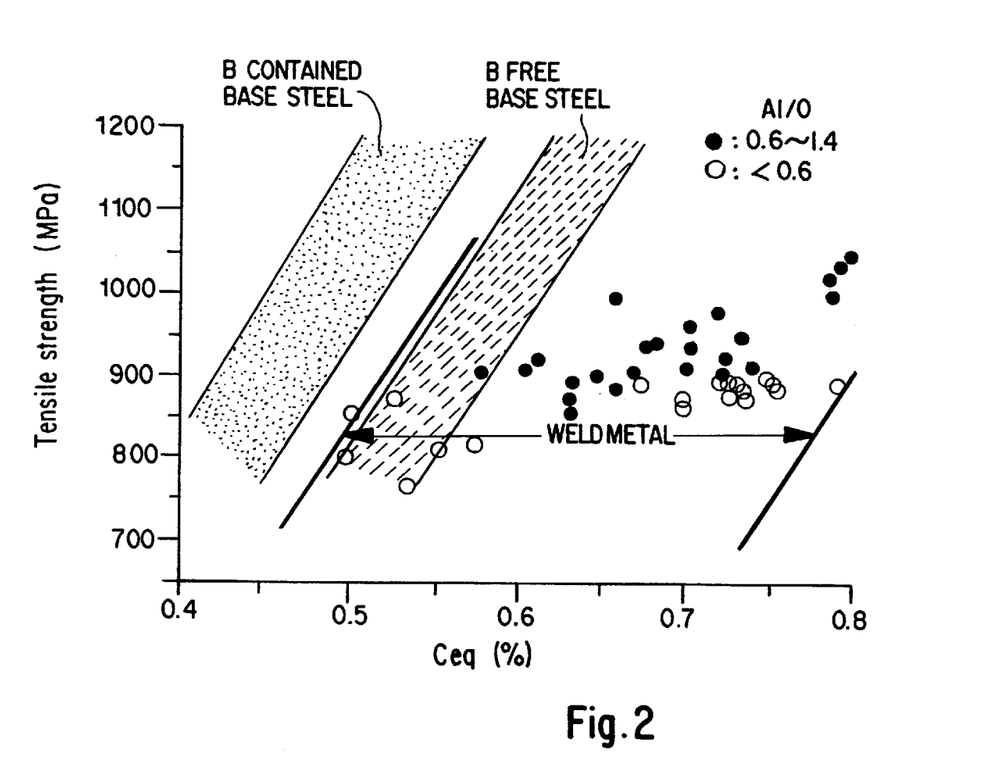
FIG. 2 is a graph showing the effect of Ceq on the TS of both base metals, B-containing steel and B-free steel (steel having substantially no effect of B).

FIG. 2 shows the effect of Ceq on the TS of B-containing and B-free steels and on the TS of weld metal when B-containing and B-free steels are welded by SAW (heat input: 5 kJ/mm). As seen from FIG. 2, the Ceq value of weld metal must be set higher than that of base metal. Also, the differential Ceq value (ΔCeq) must be set larger for B-containing steel than for B-free steel (the effect of B in base steel on the TS of weld metal is not observed).

In a welded structure of B-free steel, the Ceq value of weld metal is set at higher value by 0.05% to 0.2% than that of base metal. If ΔCeq is less than 0.05%, ΔTS does not fall within the above-mentioned range, and thus the above-mentioned matching of strength between weld metal and base metal is not attained. By contrast, if ΔCeq is in excess of 0.2%, the TS of weld metal becomes excessively high, resulting in impairment of the toughness of weld metal. Therefore, the upper limit of ΔCeq is determined to be 0.2%.

ΔCeq of B-containing steel must be set higher than that of B-free steel and is set at 0.08% to 0.3%. The upper and lower limits of ΔCeq are so determined for the same reason as in the case of B-free steel.

Welding wire for use in SAW or GMAW is not particularly limited, but is preferably of steel having the following composition.

4. Welding Wire

C: 0.02% to 0.2%

C is contained in a welding wire in order to establish an appropriate carbon content of weld metal to thereby obtain sufficient strength. To attain the effect, the lower limit of the carbon content is preferably 0.02%. By contrast, if the carbon content is excessive, weld cracking occurs. Therefore, the upper limit of the carbon content is preferably 0.2%.

Si: 0.25% to 0.9%

Si is an important element imparting sufficient strength to weld metal and serving as a deoxidizer. To obtain such effects, the lower limit of the silicon content is determined to be 0.25%. However, excess silicon causes impairment of toughness of weld metal and impairment of weld crack susceptibility. Therefore, the upper limit of the silicon content is determined to be 0.9%.

Mn: 0.7% to 4%

Mn, like Si, is an important element imparting sufficient strength to weld metal and serving as a deoxidizer. To obtain such effects, the lower limit of the manganese content is determined to be 0.7%. However, an excessive manganese content of a welding wire leads to an excessive manganese content of weld metal, resulting in impairment of toughness of weld metal and impairment of weld crack susceptibility. Therefore, the upper limit of the manganese content is determined to be 4%.

Al: 0.02% to 0.2%

Al is an important element serving as a deoxidizer. To obtain the deoxidizing effect, the lower limit of the aluminum content of a welding wire is determined to be 0.02%. By contrast, excess aluminum causes the formation of coarse inclusions in weld metal. Therefore, the upper limit of the aluminum content is determined to be 0.2%.

O: not greater than 0.01%

A welding wire is manufactured through refining molten steel. Accordingly, the oxygen content of a welding wire is relatively lower than that of weld metal. However, an oxygen content in excess of 0.01% impairs formability and has an adverse effect on oxides formed in weld metal, which will be described later. Therefore, the oxygen content is preferably not greater than 0.01%. The lower the oxygen content of a welding wire, the better.

Ti: 0.01% to 0.05%

Ti is an important element serving as a deoxidizer. A welding wire is usually manufactured through a continuous casting process. In this connection, if the titanium content is less than 0.01%, cracking occurs in the surface of a continuously cast billet. Thus, in order to obtain a sound welding wire, the titanium content is preferably not less than 0.01%. By contrast, excess titanium causes a large number of precipitates of TiC within weld metal, resulting in a significant impairment of toughness of weld metal. Therefore, the upper limit of the titanium content is determined to be 0.05%.

Cu: 0% to 1.2%

Cu may not be contained. Since Cu is effective for increasing strength through precipitation of εCu within steel, Cu is added, as needed, for the purpose of obtaining higher strength. However, if the copper content is in excess of 1.2%, weld cracking is likely to occur. Thus, the copper content is preferably not greater than 1.2%.

Ni: 0% to 3%

Ni may not be contained. Since Ni is effective for improving toughness of weld metal, Ni is added, as needed, for the purpose of obtaining higher toughness. However, if the nickel content is in excess of 3%, fluidity of molten steel becomes poor during welding, resulting in impairment of welding efficiency. Thus, the upper limit of the nickel content is preferably 3%.

Cr: 0% to 1.2%

Cr may not be contained. However, since Cr has an effect of improving hardenability, Cr is added when lower bainite is less likely to be formed due to a reduction in cooling rate of weld metal caused by increasing heat input. However, if the chromium content is in excess of 1.2%, weld cracking is likely to occur. Thus, when Cr is to be added, a chromium content is preferably not greater than 1.2%.

Mo: 0% to 1%

Mo may not be contained. However, since Mo is effective for enhancing hardenability and for increasing strength through precipitation hardening, Mo is added when welding heat input is to be increased. However, if the molybdenum content is in excess of 1%, weld cracking is highly likely to occur. Thus, when Mo is to be added, a molybdenum content of not greater than 1% is used.

V: 0% to 0.08%

V may not be contained. However, since V is effective for increasing strength through precipitation hardening, V is added, as needed, for the purpose of obtaining higher strength. If the vanadium content is in excess of 0.08%, weld cracking is likely to occur. Thus, when V is to be added, the vanadium content is preferably not greater than 0.08%.

Nb: 0% to 0.08%

Nb may not be contained. However, since Nb is effective for improving hardenability and for increasing strength through precipitation hardening, Nb is added when welding heat input is relatively high or higher strength is to be obtained However, if the niobium content is in excess of 0.08%, the toughness of weld metal is significantly impaired, and thus weld cracking is likely to occur. Thus, when Nb is to be added, a niobium content of not greater than 0.08% is used.

Among unavoidable impurities P, S, N, and the like that are contained in a welding wire and transferred into weld metal, P and S impair the toughness of weld metal; therefore, the phosphorus content is preferably not greater than 0.02%, and the sulfur content is preferably not greater than 0.02%. Also, N, if contained excessively, causes the formation of surface cracks during drawing in the manufacture of a welding wire. Therefore, the nitrogen content is preferably not greater than 0.01%.

5. Welding Method

In the manufacturing method described above in (9), SAW is performed at a heat input of 3–10 kJ/mm. The reason for employment of SAW is that heat input can be readily increased as described below and thus welding efficiency can be increased and also that through welding from one side of a joint, a melt-through bead having a favorable shape is obtained on the other side of the joint.

In SAW, when heat input is less than 3 kJ/mm, a required TS is relatively readily obtained because of a relatively large cooling rate. However, a weld defect such as lack of joint penetration is likely to occur, and the efficiency of welding a longitudinal seam for a welded steel pipe is significantly decreased. Accordingly, heat input is determined to be not less than 3 kJ/mm. By contrast, if heat input is in excess of 10 kJ/mm, a TS of not less than 900 MPa cannot be obtained even through the above-described adjustment of the contents of alloy elements such as Al in weld metal.

SAW uses flux as well as a welding wire. Flux to be used is preferably flux having a high basic index, for example, flux having the following composition: $SiO_2$: 20 wt. % to 40 wt. %; MnO: approximately 20 wt. %; CaO: 10 wt. % to 30 wt. %; $Al_2O_3$: 5 wt. % to 20 wt. %; $TiO_2$: 1 wt. % to 5 wt. %; and $CaF_2$: 0 wt. % to 40 wt. %. In order to make the value of Al/O of weld metal by SAW in the range of 0.6–1.4, it is preferable to use the wire that contains Al of preferable range 0.02–0.2 wt %, and the flux of basic index of 1.0–3.0. Here, basic index(BI) is defined by the equation: BI=(CaO+MgO+CaF2+0.5MnO)/{SiO+0.5(Al2O3+TiO2)}. Making the value of basic index of flux not less than 1.0 is preferable to make O content not greater than 0.06 wt %. In order to make the value of Al/O within the range of 0.6–1.4 more easily, it is preferable that Al content of wire is in the range of 0.02–0.1 wt %, and the basic index is in the range of 1.5–2.5.

Heat input for GMAW is preferably lower than that for SAW, for example, not greater than 7 kJ/mm. GMAW is usually used for circumferential butt welding in pipeline construction. In order to reduce the value of Al/O in the above-mentioned range by the GMAW method, it is preferable that Al content of the wire is 0.02–0.2 wt % and CO2 content of flowing gas which develops the atmosphere of the welded portion is in the range of 5–50 vol %.

6. Method of Manufacturing a Welded Steel Pipe

The methods of manufacturing a welded steel pipe as described above in (6), (7), (8), and (9) are conceived to be the UOE pipe-making process or a like method. Specifically, a steel plate is pressed into a U-shape, which is then formed into a shape having an O-shaped cross-section. The thus-butted ends of the steel plate are seam-welded. The thus-obtained seam-welded pipe is expanded. "Forming after seam-welding" refers to expansion or like processing.

EXAMPLES

Test 1:

In Test 1, the effect of the present invention was tested for a welded high-strength steel structure formed through SAW.

Steel plates having a thickness of 25 mm, a mixed structure of martensite and lower bainite, and a TS of not less than 900 MPa were used as base metals. Welded joints were manufactured from the base metals through SAW. FIG. 3 shows the chemical compositions of the steel plates.

Figure 4:
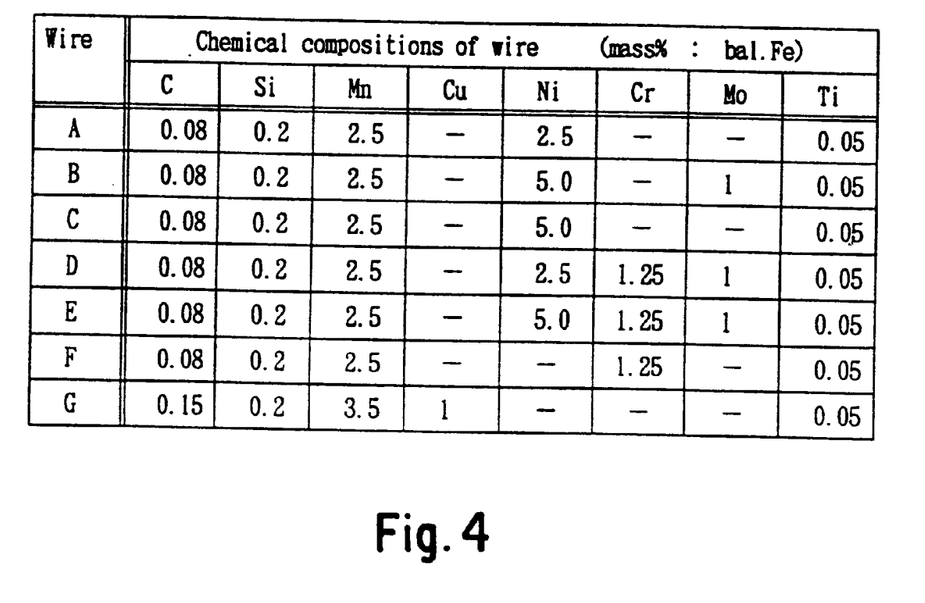
FIG. 4 is a table showing the chemical compositions of welding wires of SAW used in Test 1 of EXAMPLES.

Welding wires whose compositions conformed to the above-described ranges were used for manufacturing welded joints through SAW. FIG. 4 shows the chemical compositions of seven kinds of welding wires used in this test. These welding wires were manufactured from a 500 kg or 1 ton ingot through forging and drawing. Flux is the mixture of $SiO_2$, MnO, CaO and Al2O3 and its basic index is 2.1.

SAW was performed through 3-electrode welding with one molten metal pool. The leading electrode was a DC (current: 950 A; voltage: 30 V) electrode, followed by an AC (current: 850 A; voltage: 45 V) electrode and then an AC (current: 750 A; voltage: 50 V) electrode. Welding was proceeded as one molten metal pool was sustained. The welding speed was 1.2 m/min, and thus the welding heat input was approximately 5 kJ/mm. The oxygen content of weld metal was varied through adjustment of the basic index of flux.

FIGS. 5 and 6 show the chemical compositions of the obtained weld metals.

From the weld metals were cut round bar type tensile test pieces, each having a diameter of 6 mm and a parallel-portion length of 40 mm. These test pieces were tested for evaluating TS. From the welded joints were cut JIS No. 4 Charpy test pieces having a notch located at the center of weld metal (10 mm square, 2 mm V-notch). The Charpy test pieces were tested at various temperatures for evaluating upper shelf energy and transition temperature of fracture appearance.

Figure 7:
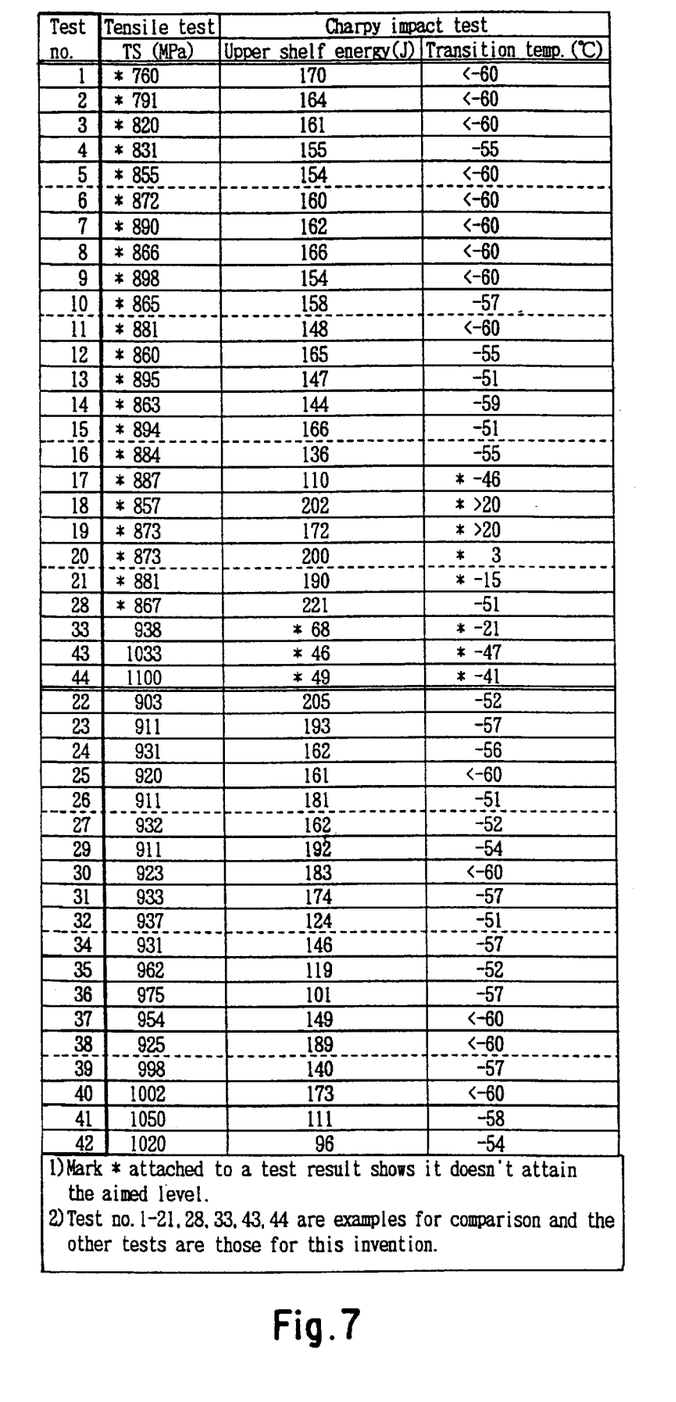
FIG. 7 is a table showing the result of Test 1 of EXAMPLES.

FIG. 7 shows the test results.

In test Nos. 1 to 6 representing comparative examples, a measured TS was less than 900 MPa because the Pcm and Al/O values are less than the respective lower limits specified as the present invention.

In test Nos. 7 to 17 representing comparative examples, an aimed strength was not obtained in spite of an increase of Pcm because the Al/O value is less than its lower limit specified as the present invention. In test Nos. 18 to 21, a TS of not less than 900 MPa was not obtained in spite of the Al/O value falling within its range specified as the present invention because the Pcm value is lower than its lower limit specified as the present invention. In weld metals of test Nos. 18 to 21, upper bainite was formed because they have a relatively low Pcm value and a relatively high Al/O value; consequently, they showed an increased transition temperature of fracture appearance as compared with other weld metals, resulting in a significant impairment of toughness.

In test Nos. 28 and 33 (comparative examples) and test Nos. 29 to 32 (examples of the present invention), identical chemical compositions except the aluminum content were used to study the effect of Al. In test No. 28 in which the aluminum content is lowest, a sufficient TS was not obtained because the Al/O value is, lower than its lower limit specified as the present invention. The Al/O value increased with the aluminum content; thus, in test Nos. 29 to 32, a TS of not less than 900 MPa was obtained. In test No. 33 in which the Al/O value was in excess of its upper limit specified as the present invention, a sufficient TS was obtained, but the coarsening of Al inclusions induced impairment of toughness, i.e. a reduction in upper shelf energy and an increase in transition temperature of fracture appearance.

In test Nos. 41 and 42 representing examples of the present invention and test No. 43 representing a comparative example, identical compositions except the aluminum and oxygen contents were used while the Al/O value was held constant, to study the effect of the oxygen content. The test result revealed that an increase in the oxygen content significantly decreased upper shelf energy and induced a gradual deterioration in transition temperature of fracture appearance. As seen from the result of test No. 43, when the oxygen content is in excess of its upper limit specified as the present invention, an adverse effect is marked occured.

In test No. 44 in which the Pcm value was in excess of its upper limit specified as the present invention, toughness was significantly impaired. By contrast, in examples of the present invention, a TS of not less than 900 MPa and high toughness were satisfactorily obtained.

Test 2:

In Test 2, the effect of the present invention was tested for the case in which A welded high-strength steel structure was a welded steel pipe. The base metal used was a steel plate having a thickness of 20 mm. The chemical composition, microstructure, and TS of the steel plate were as follows.

a) Chemical composition: 0.08% C, 0.1% Si, 1.2% Mn, 0.4% Cr, 1.0% Ni, 0.4% Mo 0.02% Nb, 0.03% V, 0.01% Ti, 0.025% Al, 0.001% B (Pcm =0.22, Ceq =0.52)

b) Microstructure: mixed structure of lower bainite and martensite c) TS: 950 MPa The steel plate was formed and seam-welded through the UOE pipe-making process, whereby a welded steel plate was formed into a pipe having an outer diameter of 914.4 mm (36"). Seam-welding was performed from both sides, one layer each, through SAW. Welding heat input was 3.2 kJ/mm on the inner surface side and 4.1 kJ/mm on the outer surface side. The same flux as was used in test 1 is also used in test 2.

Figure 8:
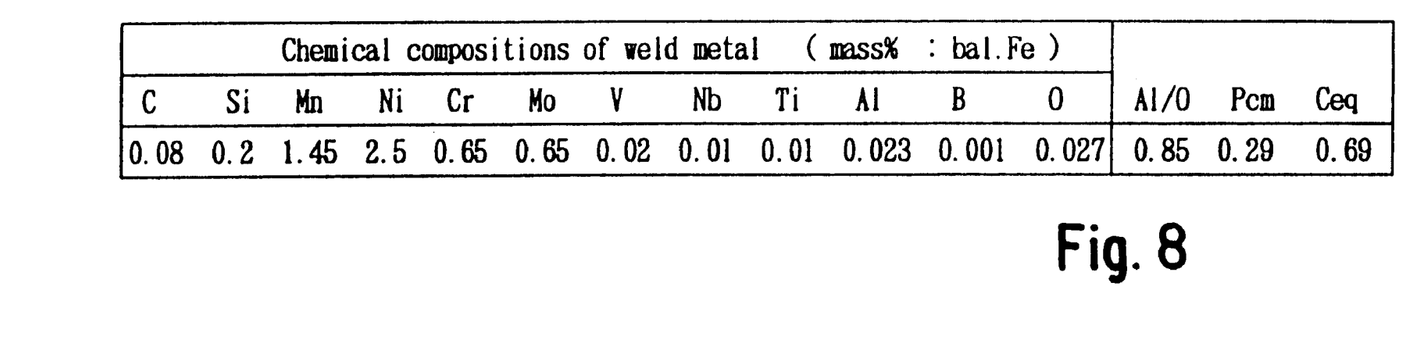
FIG. 8 is a table showing the chemical composition of weld metal tested in Test 2 of EXAMPLES.

FIG. 8 shows the chemical composition of weld metal obtained through above-mentioned welding. As seen from FIG. 8, the oxygen content is 0.027%, the Al/O (oxygen) value is 0.85, and the Pcm value is 0.29, indicating that the chemical composition falls within the range defined as the present invention. The weld metal underwent a tensile test and impact test in a manner similar to that of Test 1.

Figure 9:
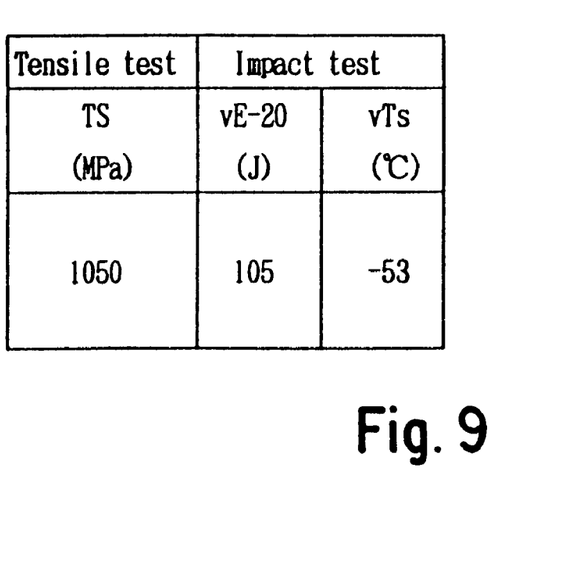
FIG. 9 is a table showing the result of Test 2 of EXAMPLES.

FIG. 9 shows the results of the tensile test and impact test. There were obtained favorable test results, specifically, a TS of 1050 MPa, an impact value of 105J at −20° C., and a transition temperature of −53° C. of fracture appearance.

Test 3:

In Test 3, the effect of the present invention was tested for the case in which a welded high-strength steel structure was a pipeline. The base metal used was a welded steel pipe manufactured in Test 2. Accordingly, the steel plate portion of the welded steel pipe (base metal) has the chemical composition as described above, and the seam-welded portion has the chemical composition as shown in FIG. 8. Portions having a length of 200 mm were cut from the welded steel pipe manufactured in Test 2, obtaining rings. The edge of a ring was prepared at an angle of 30 degrees so that a groove angle of 60 degrees was formed between two butted edge-prepared rings. The two butted rings were circumferentially welded to simulate circumferential welding for pipeline construction. The two rings were butted to each other such that respective seam-welded portions were not aligned with each other. Circumferential welding was performed through GMAW. By varying the chemical composition of a welding wire, the chemical composition of weld metal was varied. In order to obtain constant quality of weld metal in circumferential welding, a welding torch was fixed, while the rings were rotated, i.e. the so-called pipe-welding method was employed. Other welding conditions are shown below.

a) Welding wire: 1.2 mm diameter b) Current: 250–300 A c) Voltage: 25–30 V d) Welding heat input: 2 kJ/mm e) Shield gas: 80% Ar+20% $CO_2$ FIG. 10 shows the chemical compositions of weld metals of circumferentially welded joints obtained through circumferential welding described above. The weld metal of a circumferentially welded portion was conceived to have a circumferentially uniform chemical composition. The weld metals underwent the above-described tests.

FIG. 11 shows the test results for the weld metals of the above-mentioned circumferentially welded joints. In test Nos. 1 and 2 (comparative examples) and test No. 6 (example of the present invention), the oxygen contents and the aluminum contents were respectively identical, while the Pcm value was varied. TS increases with Pcm. In test No. 1, an aimed TS was not obtained because the Pcm value is lower than its lower limit specified as the present invention. In test No. 2, an excessively high TS induced impairment of upper shelf energy and transition temperature of fracture appearance. By contrast, in test No. 6 representing an example of the present invention, an obtained TS and impact performance were favorable. In test No. 3 (comparative example; Al/O=0.41), test No. 7 (example of the present invention; Al/O =0.75), test No. 8 (example of the present invention; Al/O=1.12), and test No. 4 (comparative example; Al/O=1.58), respective weld metals had substantially identical chemical compositions except the aluminum content and Al/O value. In test No. 3, the Al/O value was lower than its lower limit specified as the present invention due to the aluminum content being relatively low, resulting in a failure to obtain an aimed TS. By contrast, in test No. 4, the Al/O value was in excess of its upper limit specified as the present invention, resulting in impaired toughness. In test No. 5, the oxygen content was in excess of its upper limit specified as the present invention, resulting in a failure to obtain an aimed toughness level.

By contrast, in test Nos. 6 to 8 representing examples of the present invention, obtained strength and toughness were satisfactory.

INDUSTRIAL APPLICABILITY

According to the present invention, there are obtained welded steel structures, such as welded steel pipes, pipelines, and marine structures, having excellent low-temperature toughness and a TS of not less than 900 MPa. Thus, the present invention benefits the industry through application of such structures.

What is claimed is:

1. A welded high-strength steel structure comprising a base metal and a weld metal, wherein the base metal is a steel whose microstructure is substantially formed of a mixed structure of martensite and lower bainite and which has a tensile strength of not less than 900 MPa; and the weld metal is a steel which comprises the following alloy elements based on % by weight:

C: 0.01% to 0.15%;
Si: 0.02% to 0.6%;
Mn: 0.6% to 3%;
Al: 0.004% to 0.08%;
Ti: 0.003% to 0.03%;
O (oxygen): not greater than 0.06%
B: 0.0002% to 0.005%;
Cu: 0% to 1.2%;
Ni: 0% to 3%;
Cr: 0% to 1.2%;
Mo: 0% to 1%;
V: 0% to 0.05%; and
Nb: 0% to 0.05%, and which satisfies the equations 1) and 2) below:

$$0.25 \leq Pcm \leq 0.32$$

$$Pcm = C+(Si/30)+(Mn/20)+(Ni/60)+(Cu/20)+(Cr/20)+(Mo/15)+(V/10)+5B \quad 1)$$

$$0.6 \leq Al/O \text{ (oxygen)} \leq 1.4 \quad 2)$$

wherein each atomic symbol in equations 1) and 2) represents its content (wt. %) within the steel.

2. A welded high-strength steel structure according to claim 1, wherein the tensile strength of the weld metal is greater by 20–150 MPa than that of the base metal.

3. A welded high-strength steel structure according to claim 1, wherein the base metal comprises B of 0.0002 wt % to 0.0025 wt %; the Ceq value of the base metal defined by equation 3) below is 0.4% to 0.58%; and the Ceq value of the weld metal defined by the equation 3) below is greater by 0.08% to 0.3% than that of the base metal, and the tensile strength of the weld metal is greater by 20–150 MPa than that of the base metal:

$$Ceq = C+(Mn/6)+\{(Cu+Ni)/15\}+\{(Cr+Mo+V)/5\} \quad 3)$$

wherein each atomic symbol represents its content (wt. %) within the steel.

4. A welded high-strength steel structure according to claim 1, wherein the base metal contains substantially no B; the Ceq value of the base metal defined by equation 3) below is 0.53% to 0.7%; and the Ceq value of the weld metal defined by the equation 3) below is greater by 0.05% to 0.2% than that of the base metal, and the tensile strength of the weld metal is greater by 20–150 MPa than that of the base metal:

$$Ceq = C+(Mn/6)+\{(Cu+Ni)/15\}+\{(Cr+Mo+V)/5\} \quad 3)$$

wherein each atomic symbol represents its content (wt. %) within the steel.

5. A welded high-strength steel structure according to claim 1, wherein the base metal comprises the following alloy elements based on % by weight 0.04 to 0.15% C
0.05 to 0.49% Si
0.60 to 2.77% Mn
up to 1.21% Cu
up to 1.67% Ni
up to 0.75% Cr
up to 1.30% Mo
up to 0.79% V
up to 0.69% Nb
up to 0.16% Ti
up to 0.0015% B
0.005 to 0.062% Al
balance Fe and impurities.

6. A welded high-strength steel structure according to claim 1, wherein the weld metal includes ≦0.03% P, ≦0.03% S, and ≦0.001% N.

* * * * *